Patented Sept. 30, 1930

1,776,862

UNITED STATES PATENT OFFICE

FRANK FLOYD LINDSTAEDT, OF OAKLAND, CALIFORNIA

COMPOUND FOR USE AS INSECTICIDES, OVICIDES, AND ANTIPARASITICS

No Drawing.   Application filed April 24, 1928. Serial No. 272,565.

My invention relates to toxic substances, and particularly to such substances as are intended for use as insecticides, ovicides, and for the destruction of parasites. Although intended primarily for external application, as for example in the form of spray upon substances (vegetation, fruits, etc.) exposed to the air, it may nevertheless be employed in certain instances internally, as for example, when employed in the treatment of worms or like parasites in the digestive tract.

The advantages of nicotine and like alkaloidal derivatives of tobacco for such uses as are explained above have long been recognized. These alkaloids, of which nicotine is the major derivative, are unfortunately, quite volatile. Nicotine sulphate, which is the form commonly employed for the application of nicotine as a spray, loses its effectiveness in a few hours when exposed to the atmosphere (usually not to exceed three or four hours), and while it is effective by reason of its volatility during this period, it has no further effect thereafter. One of the chief objects of my invention, then, is to produce a new chemical compound of a volatile alkaloid or alkaloids, which will retard the liberation of the volatiles, such as nicotine, so that they remain effective for considerable periods, increasing the effectiveness of nicotine wherever it may be employed— as a spray, for example—and making possible its internal administration.

Generally speaking it is an object to produce a nicotine compound for such purposes as are indicated above, and analogous uses, from which the nicotine may be slowly liberated, to act as much by contact and ingestion to kill pests, as by suffocation, previous nicotine compounds having acted largely by suffocation.

It is a further object to produce a compound for such purposes as are indicated above, and analogous uses, which may be employed as a spray and spreader therefor combined, not requiring the addition of a separate spreader, which can be readily manufactured; and which is inexpensive.

Casein, or proteins from vegetable or animal matter, are ordinarily thought of as weakly acid, due to the manner in which the product is prepared with acids, and due to the fact that it is difficult to wash from the finished substance the last vestiges of the acid. As a matter of fact, pure casein is amphoteric, acting on occasion as an acid, and again as an alkali. Thus, while it might be possible to effect a direct reaction between casein and nicotine sulphate under laboratory conditions, the difficulty and expense of ridding the casein of the acid has made this commercially unfeasible, and, moreover, I am not aware that it has ever been proposed to combine nicotine and casein, or, in fact any volatile alkaloid with a protein. However, nicotine is available commercially in the form of nicotine alkaloid, and I have discovered that this will react directly with the commercial casein, to produce a substance having advantages not possessed by other nicotine compounds. In this reaction the acidity of the casein is a positive advantage, reacting as an acid on contact with the basic nicotine alkaloid in solution, or more properly speaking, in a colloidal dispersion, for the proteins (as casein) are not truly soluble.

The product appears to be one of addition. It is my theory that there is added to the structure of the casein molecule one or more nicotine radicals, whether one or two or more I cannot definitely state. The molecular weight generally accepted for casein is 1850, and the molecular weight of the nicotine radical is 304. If, therefore, the product is the combination of one nicotine radical with the casein molecule, the addition of 15% to 16% of absolute nicotine (molecular weight) to 85% or 84% of absolute casein would appear to satisfy the equation, but the matter is not so simple as this statement would make it appear. The casein appears to have three unsatisfied valences, and it would appear that as many as three of the nicotine radicals might combine therewith, that is to say, nearly equal molecular weights of nicotine radical and of casein might be combined. The tertiary compound, however, if formed, appears to be unstable, and for these several reasons, and for another which will appear hereafter, I prefer to combine the nicotine radical and the casein in the proportion of some 70% of casein to 30% of nicotine.

It must be borne in mind that nicotine is not the only derivative of tobacco, its source, but that all commercial nicotine compounds contain other alkaloids, as nicoteine and nicotelline. The presence of these in the nicotine alkaloid may affect the character of the final product, and the proportions of nicotine combining with the casein.

This final product is a compound which is more stable than nicotine compounds heretofore known, or at least, contains something which retards the volatization of the nicotine. It may be that it is analogous to ferric compounds, which may be reduced to ferrous compounds, and these finally to the metallic iron, whereas the known nicotine compounds decompose quickly, liberating the free nicotine in a short period, and accomplishing the killing of pests by suffocation. It is certain, however, that this new substance, which for convenience I shall call nicotine caseinate, does not free the nicotine rapidly, but continues to give off nicotine for many times the length of time required to exhaust known nicotine compounds of their nicotine. This conserves the nicotine and gives it off, to act by suffocation, in less, yet effective, quantities, but it has other advantages. It insures that there will be present, in sufficient quantities, and over long periods of time, nicotine which will irritate pests upon contact, causing them to drop off from the protected surfaces, and which if eaten by the pests will cause their death. Thus, the nicotine caseinate is effective in three ways, and over long periods of time.

The nicotine caseinate has the further property, peculiarly adopting it for a spray, that it acts as a spreader, due probably to the presence of the casein, and will thus thoroughly cover all areas exposed to it, and the spray will form a protective film over all surfaces, rather than collecting in drops to run from the surfaces. Also, when used as an orchard spray, the nicotine will have disappeared after some six to ten days, leaving the casein alone on the fruit. This is not harmful when eaten, rather the reverse, so that the fruit need not be washed, as it must when sprayed with arsenates, and in addition, the casein serves as a polish to bring out the color of the fruit—apples, for example—and thus the use of this spray not only saves the expense of washing, but adds to the attractiveness and marketability of the fruit.

While I have adopted the name nicotine caseinate for the special product which I will now describe in detail, this particular product is merely an example of compounds which may, as a class, be termed nicotine proteinates.

Also, there is the possibility that they may be found to be more correctly protein or casein nicotinates. Such proteins as are derived from or contained in peanut meal cake, soya bean meal cake, garvanza bean meal cake, castor bean cake, cotton bean cake, etc., are examples of proteins which may be employed in lieu of casein, to form nicotine proteinates. Also, it must be remembered that nicotine is employed largely because it is a comparatively cheap and available volatile alkaloid, but the other volatile derivatives of tobacco might be substituted for the nicotine, forming a nicotelline proteinate, for example.

In the commercial preparation of this nicotine caseinate I prefer to employ the ingredients in proportions which (by molecular weight) are not the extreme high or low limits, but which are intermediate the limits expressed above, and hence so proportion the actual reagents that the final product contains some 70% of casein and 30% of the nicotine radical. Thus I mix together twenty pounds of 40% free nicotine in the form of nicotine alkaloid, with twenty pounds of dry commercial casein powder, and thirty pounds of water. The proportion of water may vary with the final concentration desired. If a nicotine alkaloid of a higher percentage of free nicotine, say 95% is used, the actual volume thereof is correspondingly reduced. When the casein and nicotine are brought into contact with each other a reaction occurs, and there remains a solution, or colloidal dispersion, of nicotine caseinate. This may be, and preferably is, kept in liquid form. Its concentration is controlled by controlling the quantity of water added. The relatively transparent solution remaining can be evaporated or film-dried to obtain a hard, glassy, transparent substance, the solid nicotine caseinate, which is distinguishable from casein in that it is readily soluble in water. For commercial purposes it is not necessary nor desirable to evaporate the liquid and to produce the concentrated solid. If a dusting powder is desired, the liquid may be absorbed in such a medium as fuller's earth, bentonite, etc.

While I might employ some other compound of nicotine, as nicotine sulphate or chloride, as the starting point, rather than nicotine alkaloid, yet in practice the first step would be the formation of nicotine alkaloid therefrom by the addition of an hydroxide, as calcium hydroxide. The calcium sulphate or chloride formed by such a reaction could be left in the solution or separated therefrom, before adding the casein. Its presence would not be harmful.

The final substance, prepared in the manner stated, may be used as a spray upon vegetation, or in other places where it is desired to destroy insects, grubs, parasites, or the eggs thereof. It may be supplied for such purposes in concentrated liquid form, ready to mix with large quantities of water. Employed as a spray it will also act as a spreader, as has been explained heretofore. Thus applied it slowly decomposes, the nicotine being freed, and apparently the casein remaining, but due to the presence of the casein, and due to the fact that as the compound decomposes the nicotine is slowly given off, it remains in association with the thing which has been sprayed, over long periods, whereas nicotine disappears from previously known nicotine compounds, as nicotine sulphate, in about three or four hours, more or less, depending upon temperature and humidity conditions. Under the same conditions the nicotine can be detected in toxic quantities in and about articles sprayed with the nicotine caseinate for forty eight hours and longer.

This is of decided advantage in many ways. For the orchardist, for example, who sprays his trees for insects or pests, the first application will perhaps kill or drive away the pests, but if the nicotine disappears after a few hours, a change in the wind, or an improvement in reproducing conditions may cause reinfestation, and the spraying must be repeated. Where the effects persist for long periods, as several days, therefore, it is not necessary to watch over the orchard so closely, and furthermore, should the pests deposit their eggs before being driven off, or killed by the first spray, the eggs themselves will be destroyed by osmosis; that is to say, all life within them will be destroyed by the intimate association with, and permeation by the nicotine, or the grubs on hatching, will eat the nicotine and be killed. Not only will this reduce the cost of spraying, but it will reduce the labor attendant upon keeping close watch over the orchard, and upon frequent repetition of the spraying process.

It will be noted above that it was said to be preferable that an excess of nicotine alkaloid be employed in the formation of the compound. It is the purpose of this that there be present in the finished compound an excess of nicotine either not combined, or lossely combined with the casein, and in the form, perhaps, of nicotine alkaloid, or of a tertiary nicotine caseinate, which when the spray is first applied is available to release its nicotine quickly so that the material sprayed is provided with the protection of the nicotine vapors from the instant the spray strikes. This effect quickly disappears, but by this time the decomposition of the mono-or di-nicotine caseinate has begun, and persists over much longer periods.

Owing to the fact that casein and other proteins are not ordinarily broken up in the stomach, but farther along in the digestive tract, and owing to the comparative stability of this nicotine caseinate, it is probable that it might be administered internally in proper quantities—in fowls, for example—and that it would not harm the fowls, but would attack the parasites in the fowl's digestive tract beyond the gizzard.

What I claim as my invention is:—

1. As a new composition of matter, a compound of a volatile alkaloidal derivative of tobacco with a protein.

2. As a new composition of matter, a compound of nicotine and a protein.

3. As a new composition of matter, a compound of nicotine and casein.

4. As a new composition of matter, a protein having chemically added thereto one or more nicotine radicals.

5. As a new composition of matter, nicotine caseinate formed by the reaction of casein and nicotine alkaloid.

6. A composition of matter for use as an insecticide, ovicide, and anti-parasitic, comprising a compound of casein and nicotine alkaloid.

7. As a new composition of matter for the purposes described, the product of the reaction of 85% or less casein and 15% or more of nicotine alkaloid.

8. As a new composition of matter for the purposes described, the product of the reaction of between 85% and 50% of casein, and between 15% and 50% of nicotine alkaloid.

9. As a new composition of matter for the purposes described, the product of the reaction of substantially 30% of nicotine alkaloid and substantially 70% of casein.

10. As a new composition of matter for the purposes specified, the product of the reaction of the agents, compounded substantially in the proportions, as follows: 20 pounds of 40% pure nicotine, in the form of commercial nicotine alkaloid, 20 pounds of dry commercial casein powder, and water according to the concentration desired.

11. A new composition of matter having the probable formula:

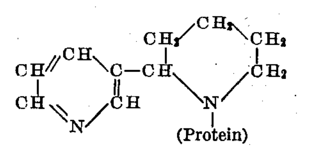

Signed at Seattle, King County, Washington, this 21st day of April, 1928.

FRANK FLOYD LINDSTAEDT.